United States Patent [19]

Ericsson

[11] 4,130,151

[45] Dec. 19, 1978

[54] LOG FEEDING AND DE-BRANCHING MECHANISM

[76] Inventor: Sven O. Ericsson, P.O. Box 2131, S-710 10 Fjugesta, Sweden

[21] Appl. No.: 805,428

[22] Filed: Jun. 10, 1977

[30] Foreign Application Priority Data

Jun. 10, 1976 [SE] Sweden .............................. 7606562

[51] Int. Cl.² ........................ B27C 9/00; A01G 23/08
[52] U.S. Cl. .............................. 144/309 AC; 144/2 Z; 254/105
[58] Field of Search .................... 144/2 Z, 3 D, 34 R, 144/34 B, 34 E, 309 AC; 254/105

[56] References Cited

U.S. PATENT DOCUMENTS

| | | | |
|---|---|---|---|
| 3,556,180 | 1/1971 | Jones | 144/2 Z |
| 3,612,117 | 10/1971 | Kjell | 144/2 Z |
| 3,713,467 | 1/1973 | Pierrot | 144/2 Z |
| 3,720,246 | 3/1973 | David | 144/2 Z |
| 3,838,721 | 10/1974 | Golob et al. | 144/3 D |
| 3,892,266 | 7/1975 | Puna | 144/3 D X |
| 3,894,568 | 7/1975 | Windsor | 144/2 Z |
| 3,960,189 | 6/1976 | Windsor et al. | 144/2 Z X |
| 3,960,190 | 6/1976 | Smith | 144/2 Z |

*Primary Examiner*—Othell M. Simpson
*Assistant Examiner*—W. D. Bray
*Attorney, Agent, or Firm*—Hill, Gross, Simpson, Van Santen, Steadman, Chiara & Simpson

[57] ABSTRACT

A log feeding and de-branching mechanism comprising two sets of alternately operating tools which grip around the log to alternately hold the log for lengthwise feeding and to debranch the log, respectively, and which tool sets are linearly movable in mutually opposite directions.

9 Claims, 1 Drawing Figure

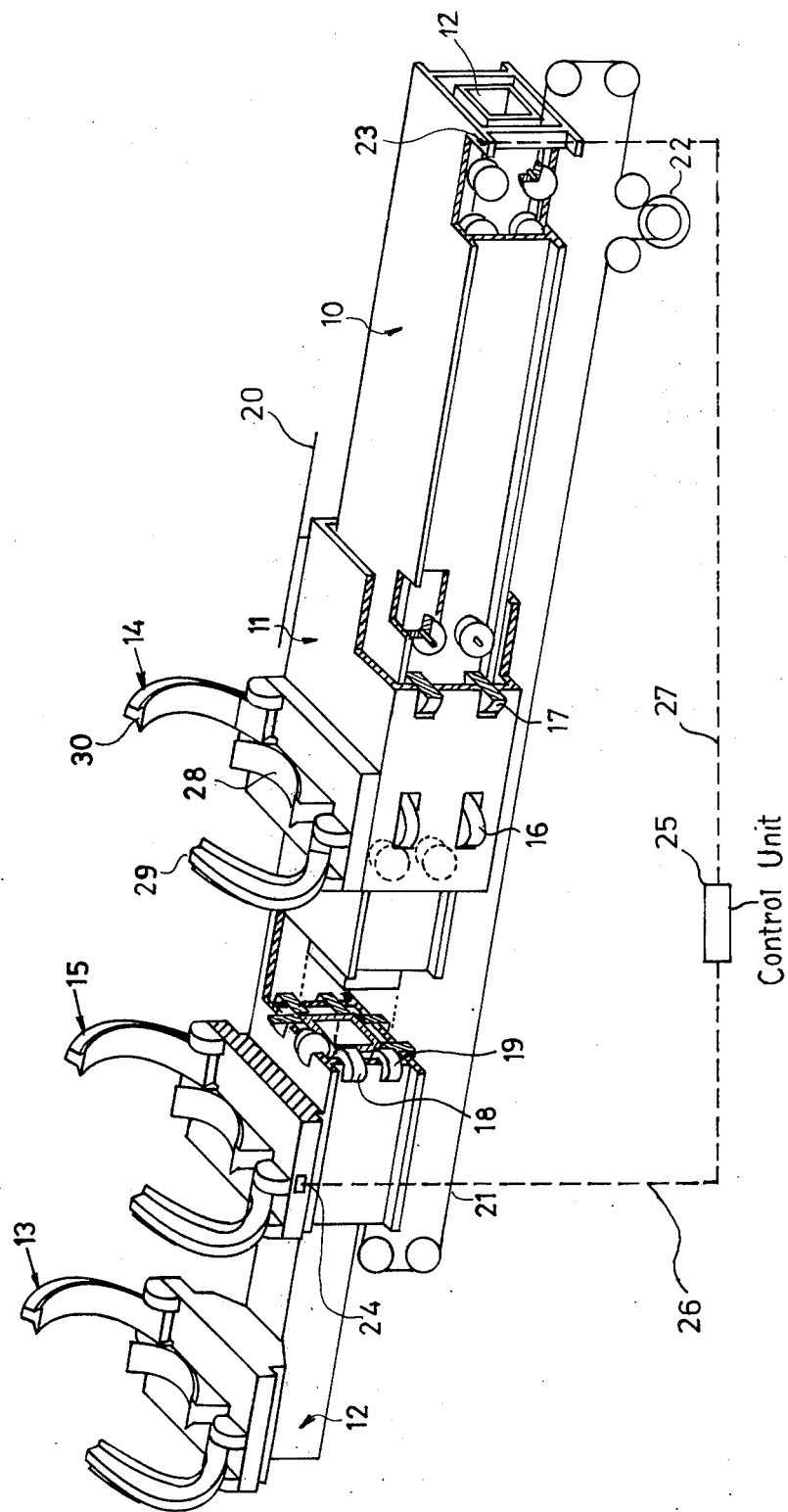

LOG FEEDING AND DE-BRANCHING MECHANISM

BACKGROUND OF THE INVENTION

1. Field of the Invention

This invention relates to a method and apparatus for debranching felled trees.

2. Prior Art

During recent years a plurality of different types of machines for the mechanized lumbering industry have been proposed. Common to most of such machines is that their infeed mechanismus comprise so called peg rollers. A problem with such rollers is that they quite often cause damage to the outer wood layers which damage is of a rather large significance in that the quality of the wood is impaired.

SUMMARY OF THE INVENTION

According to the invention there is provided a mechanism for feeding and de-branching of a felled tree as a log comprising two sets of alternately operating tools which extend around the log and are movable toward and away from each other, and which are engageable with each log to grip it and advance it, and de-branch it, respectively, as the log is fed through the tools, means for moving said tools toward and away from each other, means for imparting to said tools a gripping force against the log, and means for controlling the gripping force of said tools in such a manner that they alternately grip around the log with a high and a low gripping force, respectively.

ON THE DRAWING

The drawing is a perspective view, partly broken away, of one embodiment of the mechanism according to the invention.

DESCRIPTION OF A PREFERRED EMBODIMENT

The mechanism comprises an elongated frame beam 10 on which a carriage 11 is longitudinally movably guided. Within the frame beam 10 an elongated slide beam 12 is longitudinally movably guided. The outermost end of the slide beam 12, i.e. the left hand end in the drawing, is equipped with a gripping and debranching tool generally denoted 13, and the carriage 11 is equipped with a similar tool, generally denoted 14. These two gripping and de-branching tools, as also a gripping and debranching tool, generally denoted 15, at the outermost (left) end of the frame beam 10, will in the following description, for convenience, be referred to simply as the tool 13, 14 and 15, respectively.

The mechanism as shown is provided with a number of support rollers to guide the carriage, such as the rollers 16, 17, and support rollers to guide the slide beam, such as the guide rollers 18, 19. Further, the mechanism has a drive transmission 20, shown diagrammatically, to drive the carriage 11 in relation to the frame beam 10, and a drive transmission 21 to drive the slide beam, and the necessary drive motors for these transmissions, such as the drive motor 22. Further, the mechanism comprises a number of limit switches, such as the switches 23 and 24, which are connected to a suitable automatic control unit which in the instant case is diagrammatically illustrated by the control unit 25 with appropriate control lines 26, 27. The structural details mentioned above may be designed in many different ways within the scope of the invention for which reason they have been shown diagrammatically only, and they need not be described in greater detail below as such details may be chosen and arranged in a suitable manner by those skilled in the art. Further, the drawing does not show any mechanisms to close and open the tools 13, 14, 15, as such mechanisms do not form any part of the invention.

Each one the tools 13, 14, 15 comprises a stationary knife beam 28 which extends arcuately in a plane transverse to the longitudinal direction of the frame beam 10 and a pair of substantially semi-circular knives 29 and 30, each of which has one end thereof pivotally journalled at one end of the stationary knife 28, and are pivotable toward and away from each other in a plane transverse to the plane of the frame beam 10 for closing around a log during operation, and with different operational force as is evident from the following description.

The mechanism operates in the following manner:

A felled tree is placed on the mechanism, for instance by means of a so called folding arm crane, whereupon the mechanism is started from the control unit 25. At this moment the tool 13 grips around the tree with a low force whereas the tool 14 grips around the tree with a higher force, and then the tool feeding movement by means of the transmissions 20, 21 is start so as to move the tools 13 and 14 apart from each other. At this stage the tool 14 moves the tree to the right according to the drawing in order to feed the tree, whereas the tool 13 performs the debranching. The slide beam 12 and the carriage 11 may have a stroke of 2.5 meters, for instance. Thus, when the tools have reached their end positions, at a maximum distance from each other, a tree length of 5 meters has been de-branched.

When the tools 13 and 14 have reached their outermost end positions the operational forces of the tools 13 and 14 are automatically altered so that the tool 13 grips the tree with a high force whereas the tool 14 grips around the tree with a lower force enabling relative movement therebetween. Then, the directions of movement of the slide beam 12 and the carriage 11 are reversed, after which the continued feeding of the tree through the mechanism is performed by means of the tool 13 with a simultaneous de-branching performed by means of the tool 14. A first operational cycle has been completed when the tools again have reached a position close to each other.

The tool having the low force at any instant (the debranching tool) has preferably a slightly higher speed than the feeding tool having the higher force for the moment. Thus the de-branching tool is able to reach its end position and grip the tree with a higher force to start feeding before the momentarily feeding tool reaches its end position and is switched over to a lower force. The tool sets are individually driven along the frame beam 10, for instance by means of hydraulic motors, the pumps of which are controlled by means of the switches 23, 24, whereby the variation of the linear speed of the tool sets is controlled by a corresponding control of the displacement of the pumps. Preferably, the pumps are mutually, synchronized to prevent mistiming between the tool sets.

The feeding goes on continuously until a programmed length has been obtained or until the feeding is interrupted manually. The feeding may be programmed in such a manner that it is carried out in steps such as 3 meters, whereupon the tree is stopped and cut off, a predetermined minimum dimension having been reached.

Preferably, the control unit 25 is reversible, so that the debranched tree, or a top portion thereof, may be fed reversely out of the mechanism. Further, the control unit 25 is preferably designed in such a manner that only one or the other tool may be manually controlled to receive the low force whereas the other one is controlled to receive the force, whereby also extremely thick branches may be cut off from the tree by repeated blows.

The description above is concerned only with the tools 13 and 14. The tool 15 per se is not necessary for the above described general function but the mechanism should preferably be equipped with that additional tool 15 which may then be utilized for holding a last de-branching and cut tree length while the tools 13 and 14 return to their end positions as set forth above.

Minor modifications and alterations as to details my be carried out within the scope of the inventive idea.

What I claim is:

1. A method for debranching a felled tree and simultaneously feeding it axially as a log, comprising:
    (a) tightly gripping the tree with a high gripping force by means of a first set of debranching tools which extend around the tree;
    (b) loosely gripping the tree with a low gripping force by means of a second set of debranching tools which extend around the tree;
    (c) thereafter shifting said first set of tools to effect initial axial feeding while shifting said second set of tools in an opposite direction along a portion of the length of the log to effect initial debranching;
    (d) lowering said high gripping force to a low gripping force, and increasing said first-named low gripping force to a high gripping force; and
    (e) thereafter shifting said first and second sets of tools in directions opposite to those in which they were first shifted to respectively effect (1) further debranching by said first set of tools along a further portion of the length of the log, (2) and further axial feeding by said second set of tools.

2. A method as set forth in claim 1, which includes after a partial completion of either of said shifting steps, moving said sets of tools for at least part of the available travel in the opposite direction, and then resuming said shifting step, whereby the set of tools then having the low gripping force will provide a plurality of blows for cutting off a thick branch.

3. A method as set forth in claim 1, in which the shifting rate of said set of tools then having said low gripping force is higher than the shifting rate of said set of tools then having said high gripping force, whereby the then faster shifting set of tools completes its debranching while the other set of tools is last mentioned the log, and thereafter effecting the increasing of said low gripping force to the high gripping force before said "still feeding" is completed.

4. A log debranching and feeding mechanism comprising:
    (a) two sets of reciprocable operating tools extendible around the log, each set being supported for simultaneous movement toward and away from the other set, and each set including debranching means adapted to be alternately pressed against the log with
        (1) a gripping force to grip and feed the log, and
        (2) with a non-gripping force to debranch the log as the log is fed through the mechanism;
    (b) means connected to said tool sets for moving each of the tool sets simultaneously toward and away from each other;
    (c) means connected to each of said tool sets for pressing them against the log; and
    (d) means connected to said last-named means for controlling the pressing forces of each of the tool sets in out-of-phase relation to the other in such a manner that each tool set alternately respectively grips the log with a high gripping force to feed it during one direction of movement and then engages the log with a somewhat lower gripping force to debranch it during the other direction of movement.

5. A mechanism as claimed in claim 4, including: a frame beam; a slide beam longitudinally movably guided in and projecting from said frame beam; one of said sets of tools being supported at the outer end of said slide beam; and a carriage carrying the other of said sets of tools and longitudinally movably guided on said frame beam.

6. A mechanism as claimed in claim 4, wherein said moving means are adapted to be independently driven for each of said tool sets.

7. A mechanism as claimed in claim 4, comprising means, responsive to the position of each said tool set, for increasing the pressing force of the tool set which is then debranching to the high gripping clamping force slightly in advance of partially releasing the gripping force of the tool set which is then feeding to the somewhat lower debranching gripping force.

8. A mechansim according to claim 4, said moving means comprising a pair of hydraulic motors each acting on one of said tool sets.

9. A mechainsm according to claim 4, said moving means being alternately operable on said tool sets to move that one of said tool sets then imparting said lower radial force at a higher rate of linear displacement than that of the other of said tool sets.

* * * * *